United States Patent [19]

Myers

[11] 4,237,675
[45] Dec. 9, 1980

[54] METHOD AND APPARATUS FOR ASSEMBLYING TUBULAR SLEEVE PREFORMS ONTO CONTAINERS IN PRECISE ALIGNMENT

[75] Inventor: Jack H. Myers, Toledo, Ohio

[73] Assignee: Owens-Illinois, Inc., Toledo, Ohio

[21] Appl. No.: 50,577

[22] Filed: Jun. 21, 1979

[51] Int. Cl.³ ........................ B65B 21/24; B65B 53/02
[52] U.S. Cl. ...................................... 53/397; 53/442; 53/585; 156/86
[58] Field of Search .............. 53/397, 399, 442, 556, 53/585, 291, 295; 156/86, 423, 567

[56] References Cited

U.S. PATENT DOCUMENTS 4,072,553  2/1978  Braker et al. ...................... 53/442 X

*Primary Examiner*—Travis S. McGehee
*Attorney, Agent, or Firm*—E. J. Holler; M. E. Click; D. H. Wilson

[57] ABSTRACT

This invention relates to method and apparatus for producing a composite container having a tubular sleeve mounted precisely thereon adapted to be shrunken into final surface covering position. The tubular sleeve is preformed of relatively-flexible thin material and flat-folded until ready for use when it is opened and conveyed into axial registry with the container. The sleeve preform of heat-shrinkable plastic material is telescopically assembled onto the container and the container is then firmly retained at an upper region. A reciprocatable apertured head contacts the preform while so retained and further telescopes the preform at least partially over the container. With the reciprocatable apertured head then stationarily maintained, the container is elevated so that the apertured head further lowers the preform into finally-aligned position on the container where it is adapted to subsequent heat-shrinking in place in permanent conforming arrangement.

17 Claims, 6 Drawing Figures

METHOD AND APPARATUS FOR ASSEMBLYING TUBULAR SLEEVE PREFORMS ONTO CONTAINERS IN PRECISE ALIGNMENT

BACKGROUND OF THE INVENTION

1. Field of the Invention

This invention relates to the manufacture of containers and primarily to the assembly of a hollow sleeve preform onto a container in precisely positioned arrangement. The preform is taken from a stacked flattened condition to a position immediately above the container where it is opened and partially telescoped over the container in coaxial alignment therewith. The container neck or finish portion is retained and a reciprocatable apertured head member serves to lower the sleeve into an intermediate position on the container body while the container is held. The container is then elevated to further lower the sleeve with respect to the container body by the sleeve being in continued contact with apertured head which is stationarily maintained. The preform is thus finally assembled into precise position on the container body by such telescoping movement. The final shrinking of the preform onto the container, as can be performed by many appropriate physical conditions such as by heating, is not part of this invention.

2. Description of Prior Art

This invention comprises an improvement over the methods and apparatus disclosed in issued U.S. Pat. Nos. 3,767,496, issued Oct. 23, 1973; 3,802,942 issued Apr. 9, 1974; and 3,959,065 issued May 25, 1976, all of which are commonly owned with the present application. In each of these disclosures, a tubular sleeve is formed which is telescopically assembled onto the article from below by a push-up mechanism. None of these disclosures pertain to a sleeve which is stored in prefabricated flattened condition and then telescoped over the container in two or more stepwise telescoping operations to permit efficient and rapid assembly.

In many of the previously-disclosed processes and apparatuses for making composite containers having an integral plastic base or sleeve thereon, a manufactured glass bottle or jar is loaded onto a conveyor and preheated prior to mounting the plastic sleeve. The plastic sleeves carried on an underlying turret pass into alignment with the bottles and are moved vertically upwardly into telescopic assembly over the lower ends of the bottles. The sleeves are then carried on the bottles into a heating apparatus such as a tunnel oven wherein appropriate physical conditions shrink the sleeves into close-fitting conforming arrangement over the bottle surfaces were assembled. The heating apparatus commonly consists of a lengthwise oven through which the bottles are passed, the oven temperatures ranging from about 170° to 800° F., depending upon the plastic material selected to comprise the sleeves. U.S. Pat. No. 3,959,065, owned by the common assignee of this application, discloses method and apparatus which assure against dislocation of the sleeve on the bottle without external handling mechanism being required to retain the sleeve in place between its assembly point with the bottle and the shrinking oven.

The cap sealing of bottles has been conventionally performed in recent years to provide for reasons of sanitation, pilfer-proofing, safety and appearance; the further step of placing over and around the bottle, as well as preferably over at least a part of its closure, a tubular sleeve of heat-contracting synthetic resin material, severed to a prescribed length, and then sealing the sleeve to the bottle by thermal contraction. The synthetic resin tubing is usually pressed flat and delivered in rolls in many production processes, and since the tubing may or may not stay fully flattened depending upon its elastic memory, particularly where it is comprised of extremely flexible and resilient material, inefficiencies can and do occur when the severed lengths of tubing are fitted onto the bottle necks.

It is also possible to apply the tubes around the bottle necks without preforming the material, as taught by U.S. Pat. No. 3,861,918 to Muto; however, such method requires the application of a bonding agent to the bottle neck for adherence of the sleeve. The method and apparatus disclosed by this patent are exceedingly more complex than the present invention, and prone to occasionally misapply or fail to apply a tubular band or label. U.S. Pat. No. 2,852,899 to Murrell discloses a collar feeding mechanism which is designed to remove only the lowermost collar from a nested stack by frictional engagement with its inner surface. The collars are preformed and nested tightly into a stack from which they are deliverable onto the container necks.

SUMMARY OF THE INVENTION

An object of this invention is to provide method and apparatus for positively aligning a tubular sleeve or preform of thin flexible thermoplastic material which has been previously placed in telescoping relation over the upper portion of a container in precise position thereon by moving the sleeve or preform downwardly stepwise with respect to said container.

The present invention, as disclosed hereinafter in a specific preferred embodiment, provides both method and apparatus for applying a preformed, relatively-flexible tubular band or sleeve to the body portion of a container where it is frictionally retained prior to subsequent heat shrinking of the band onto the container in final conforming relation. The invention permits controlled telescopic assembly of the band downwardly onto the container body portion in two stages, the first while the container neck is retained with the band initially telescoped over the upper region of the container in co-axial alignment, and the second while the band is held stationary and the container is moved upwardly to move the band into final telescoped arrangement on the container body portion. The bands formed of thin flexible material are stored in flat-folded condition and then opened serially to be applied over the top of an individual container. An endless conveyor having a series of partible jaw members mounted in spaced-apart array is adapted to move the containers in a horizontal path with the bands partially telescoped thereover. An apertured plate member is adapted to move reciprocatably vertically to lower the band over the retained container in two stages. The band is adapted to temporary retention in place by friction due to its close fitting dimensions on the container body until it is heat shrunken into conforming permanent relationship thereon.

The apparatus includes a rotary mechanism which constitutes an endless chain-type conveyor movable in a horizontal plane adapted to retain an upper portion of the containers by partible jaw chucks. The chucking devices are mounted in spaced-apart series on the endless conveyor in vertically reciprocatable arrangement.

The chucks are capable of retaining the upper finish portion of the containers and holding same in vertical relation. A movable apertured plate member is located in vertical alignment with each chuck device adapted to engage the upper extremity of a tubular preform for lowering the same onto the container body. The apertured plate initially moved downwardly to lower the sleeve to an intermediate position and then is moved upwardly to allow the sleeve to recover from a crinkled condition due to its loading, and is then retained stationarily while the container is raised to lower the sleeve still further with respect to the container body.

Another feature of the invention is the two-stage telescopic movement of the tubular sleeve, due to its tendency to crinkle when loaded during telescopic movement, over the container body portion where it is frictionally engaged in precise position prior to heat shrinkage of the sleeve onto the surrounded surface area in snug conforming relation.

DESCRIPTION OF THE PREFERRED EMBODIMENT

Figure 1:
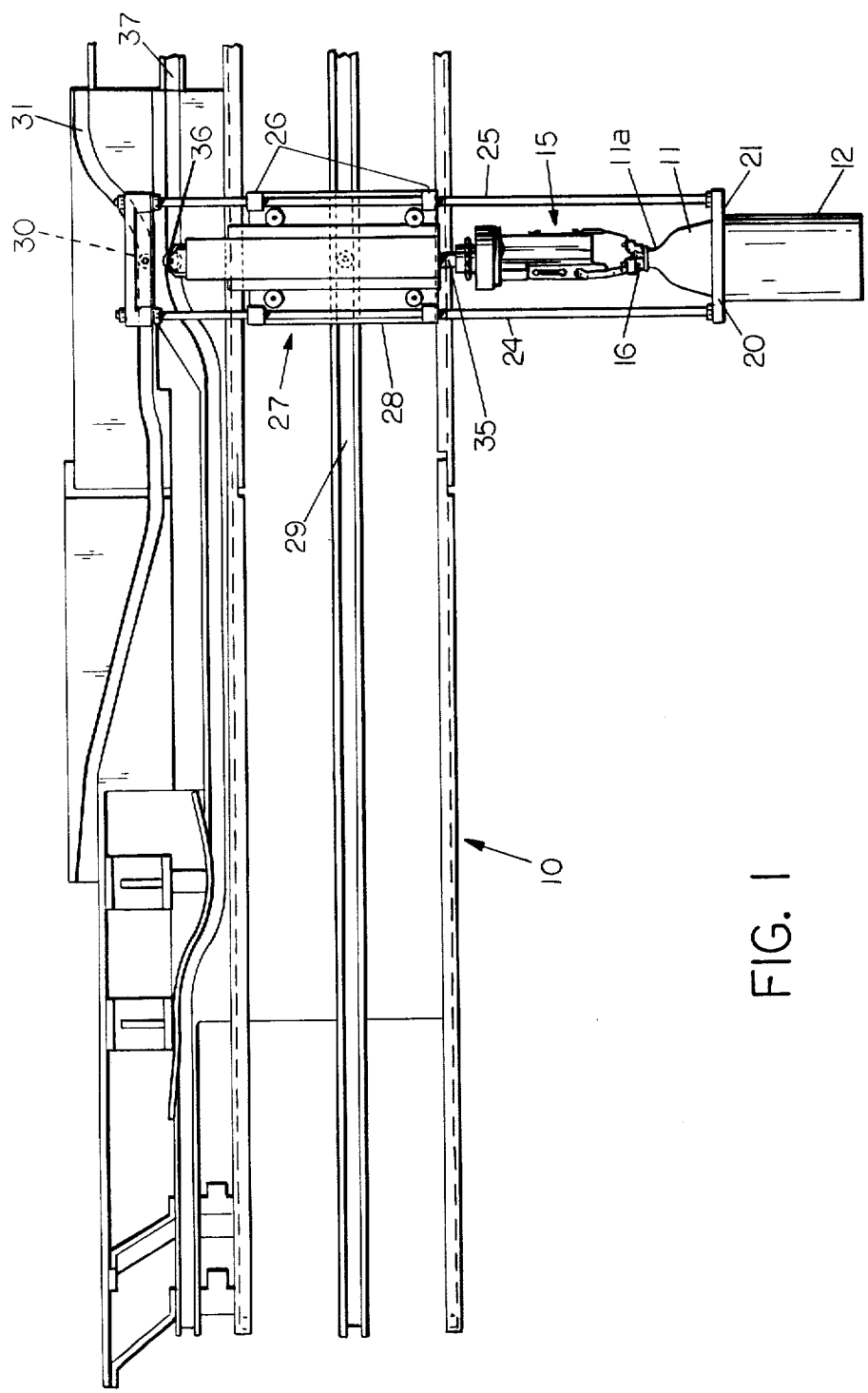
FIG. 1 is a side elevational view of conveyor apparatus in accordance with the invention.
Figure 2:
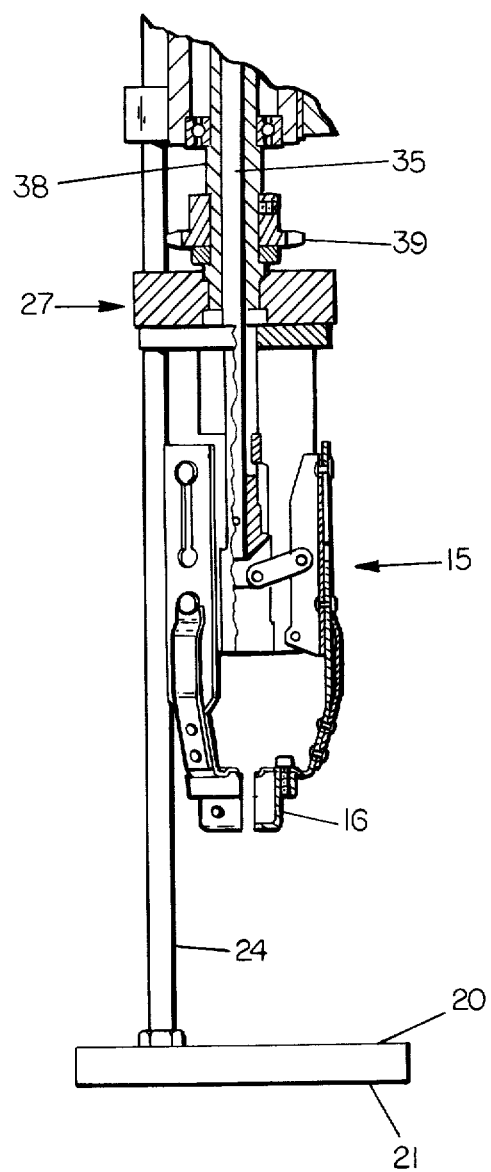
FIG. 2 is a further enlarged side elevational view partly in vertical section of the apparatus shown in FIG. 1.
Figure 3:
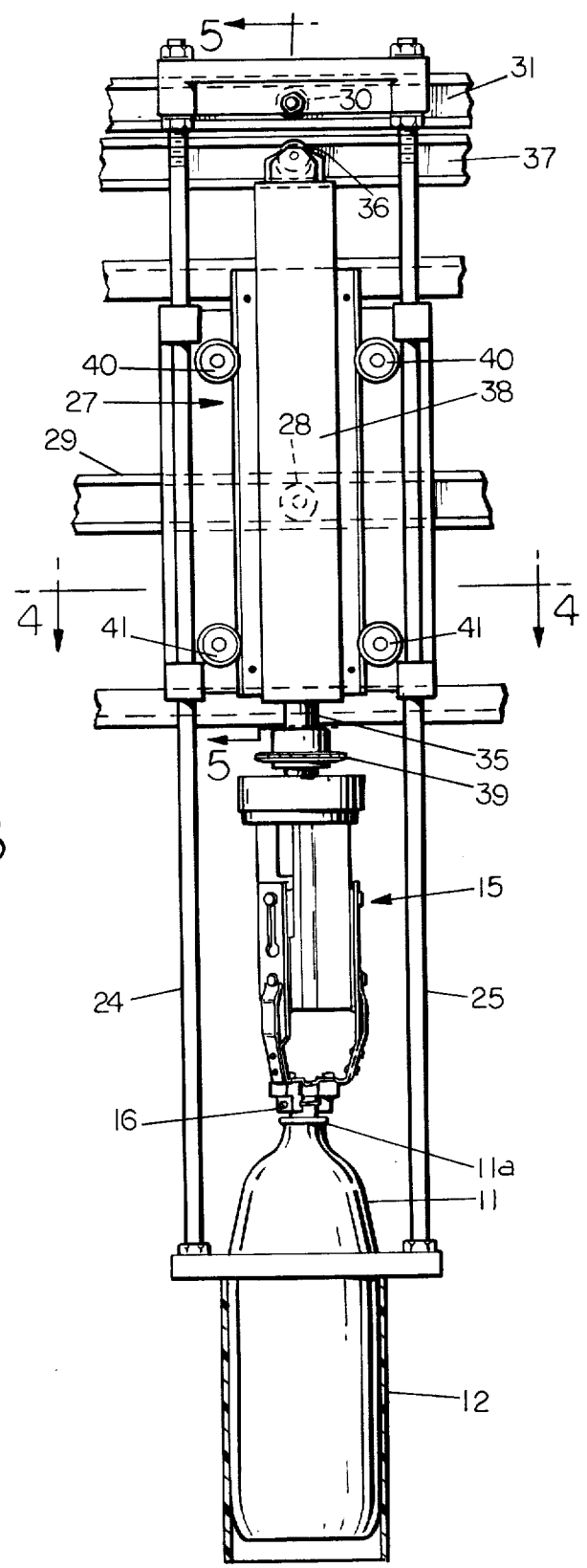
FIG. 3 is a still further enlarged side elevational view of the apparatus shown in FIGS. 1 and 2.
Figure 4:
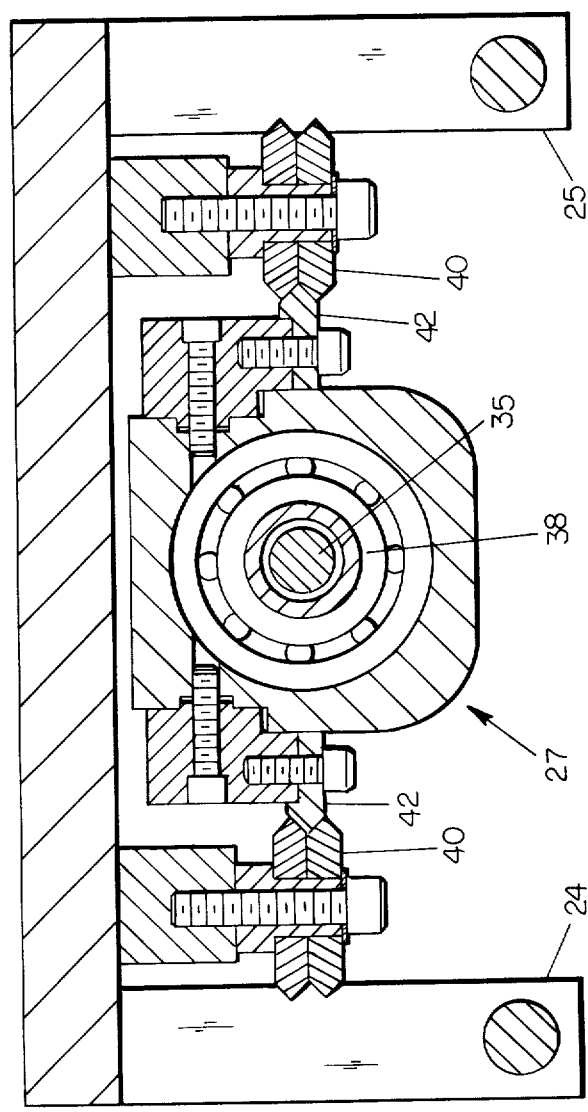
FIG. 4 is a horizontal sectional view taken along the line 4—4 of FIG. 3.

As shown in FIG. 1 of the drawings, the apparatus for assemblying containers with plastic sleeves thereon consists of a rotary endless conveyor 10 which is adapted to move in a horizontal path to receive and convey the containers 11, each container bearing a tubular sleeve 12 around at least a major upper portion of its circumference. The containers preferably consist of rigid hollow plastic bottles which are normally in unfilled condition without a closure thereon.

The containers 11 are each delivered to the rotary endless conveyor 10 serially in spaced-apart arrangement with an individual sleeve 12 partially telescoped over the upper region. The conveyor is of conventional construction adapted to retain the containers by an upper finish or threaded mouth portion 11a. The conveyor 10 has a series of equi-spaced chucking devices 15 facing downwardly located throughout its length. The chucking devices each have partible jaws 16 adapted to firmly engage the container finish 11a. The chucks are mounted is series in vertically-reciprocatable relation on the conveyor 10 so that the retained containers can be raised and lowered, as well as rotated.

The containers 11 are normally delivered to the endless conveyor 10 by another conveyor (not shown) on which the containers rest in spaced-apart standing relation. The containers then each have the preformed tubular sleeve 12 telescoped over the upper region as applied on the previous conveyor or by a separate assemblying machine (not shown). The sleeve is telescoped downwardly a sufficient distance to permit the chucking device 15 on the endless overhead conveyor to grasp each container by its threaded upper end 11a.

The multiple-component jaws 16 of the chucking device 15 are closed to grasp an individual container 11 by the exterior of its open mouth for positive conveyance. The sleeve 12 is initially located low enough on the container to permit firm retention by the jaws of the chucking device.

Immediately following retention of the container 11 by the chucking device 15, an apertured plate 20 which is mounted in vertical alignment with the chucking device is lowered so that its flat lower surface 21 contacts the upper edge of the telescoped sleeve 11. Apertured plate 20 has a central opening of slightly greater diameter than the exterior diameter of the cylindrical container or bottle. The sleeve 12 which is mounted in stationary relation on the container and held thereon by friction is lowered to an intermediate position on the container by annular contact with the lower surface 21 of apertured plate.

The sleeves 11 are preferably comprised of thin film thermoplastic material such as polyvinyl chloride having decorated exterior surfaces and a preferred thickness ranging from about 1 to 2 mils. The sleeves may also range from about 1 to 5 mils in thickness, depending upon whether they consist of film, foam or film-foam laminates. The material has a primary orientation extending in a circumferential direction around the preformed sleeves which have an axially-extending fusion seal or seam where they are formed from flat blanks. The sleeves are extremely flexible and lightweight in the case of film making them relatively difficult to handle and manipulate. The sleeves are flat folded along diametrically-opposed fold lines extending in an axial direction and have a diameter slightly greater than the body portion of the containers on which they are to be mounted. The sleeves preferably have an axial length complemental to the cylindrical body portion of the containers for covering same. The sleeves are heat-shrinkable when subjected to a moderate elevated temperature so that the sleeves will uniformly contract to tightly conform to the underlying container surfaces.

Figure 5:
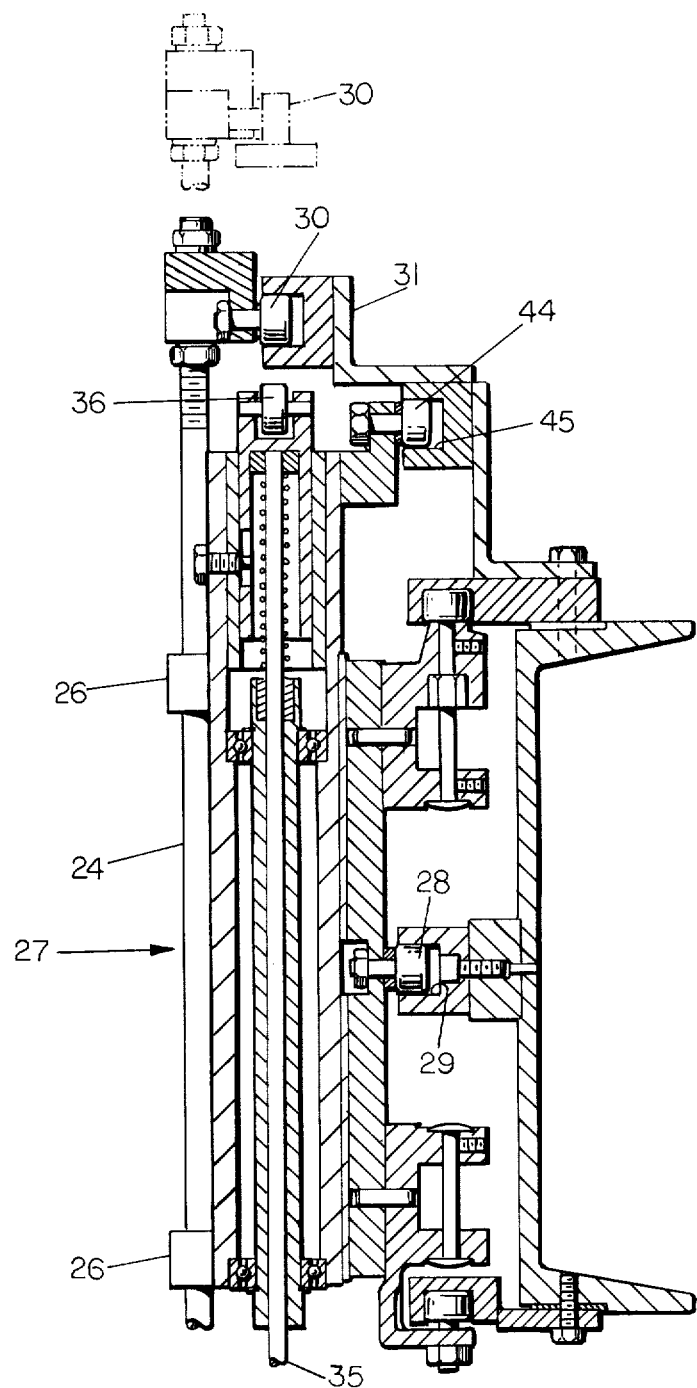
FIG. 5 is a vertical sectional view taken along the line 5—5 of FIG. 3.

Apertured plate 20 is mounted in horizontal relation on the lower ends of a pair of vertical rods 24 and 25. The upper portions of the two rods 24 and 25 are mounted within vertical pairs of stationary slide blocks or bearings 26 within which they are vertically slidable. The slide blocks 26 are mounted in stationary relation in pairs on a carriage assembly 27 which may be moved upwardly or downwardly by a cam follower 44 mounted within a cam track 45 as shown in FIG. 5. The vertical rods 24 and 25 and apertured plate 20 are moved reciprocatably vertically by a cam follower 30 located within stationary upper cam track 31.

The partible jaws 16 are comprised of three arcuately-shaped members adapted to tightly close around the container upper end 11a. The jaws are spring loaded so that they can be cammed open and closed around the container mouth during a limited portion of the conveyor horizontal travel at the container pick-up point. Cam follower 36 located in cam track 37 serves to open and close the jaws 16 for container retention. The jaws are closed immediately prior to reaching the position shown in FIG. 1. Chucking device 15 is mounted on a vertical shaft 35 which can be rotated as well as cammed upwardly and downwardly during its travel around the conveyor. Only one chucking device 15 is shown on the conveyor 10 in FIG. 1; however, a plurality of similar devices is normally positioned around the periphery of the conveyor in closely-spaced relation for sequentially engaging the containers. Shaft 35 is mounted within the carriage 27 for its vertical operation when moved by cam follower 44 located within stationary cam track 45. The vertical shaft 35 is journaled within a vertical hollow column 38 for its vertical movement; the carriage carrying the cam follower 44 at an upper region. A gear wheel 39 is located near the lower extremity of shaft 35 and fixed thereto to permit rotation of the chucking device when such gear is engaged by a stationary rack (not shown) during its travel around the conveyor. The carriage 27 is able to be moved vertically with pairs of notched rollers 40 and 41 located at upper and lower regions respectively able to retain the same in vertical alignment. The sides of the carriage have rigid rails 42 which move with respect to the rollers and are attached to column 38.

When the sleeve is first lowered by apertured plate 20 during left-to-right movement of the conveyor, the upper portion of the sleeve tends to crinkle due to the loading on its thin walls. The downward stroke of the apertured plate is thereby limited since any crinkled condition in the upper portion of the sleeve tends to prevent or impede its uniform application to the container. The plate serves to push the sleeve down for a limited distance to an intermediate position on the container; after which the plate 20 is raised slightly out of contact with the sleeve. The plate 20 is raised by upward movement of cam follower 30. Any crinkling of the sleeve upper portion tends to disappear when the upper loading is relieved. The diameter of the plate opening is such that it fits closely around the container exterior walls. With the sleeve having opposing fold lines, the sleeve is able to slide telescopically on the container when loaded by the plate, and be retained by friction in stationary partially-applied uncrinkled condition when the plate loading is removed.

As stated, after the sleeve is located at an intermediate position on the container, the plate is raised a short distance to allow the upper crinkling to disappear due to elastic memory of the sleeve material. The plate is elevated by the cam follower 30 being moved upwardly in cam track 31 which controls the lowering and raising of the plate 20 and its support rods 24 and 25.

The lower surface of the plate is then taken out of contact with the sleeve. Immediately following such discontinuance of contact, the container is then raised by its chucking device 15 being elevated at a uniform rate. Renewed contact of the sleeve upper edge with the stationary flat lower surface 21 of the apertured effects a further lowering of the sleeve with respect to the container. The chucking device is raised by cam follower 44 located within cam track 45 located along and co-extensive with the endless conveyor. The latter raising of the container with respect to the sleeve, which is held stationarily by the apertured plate, thus moves the sleeve into final position on the container body. The sleeve is then in position to be heat shrunk onto the container body.

Figure 6:
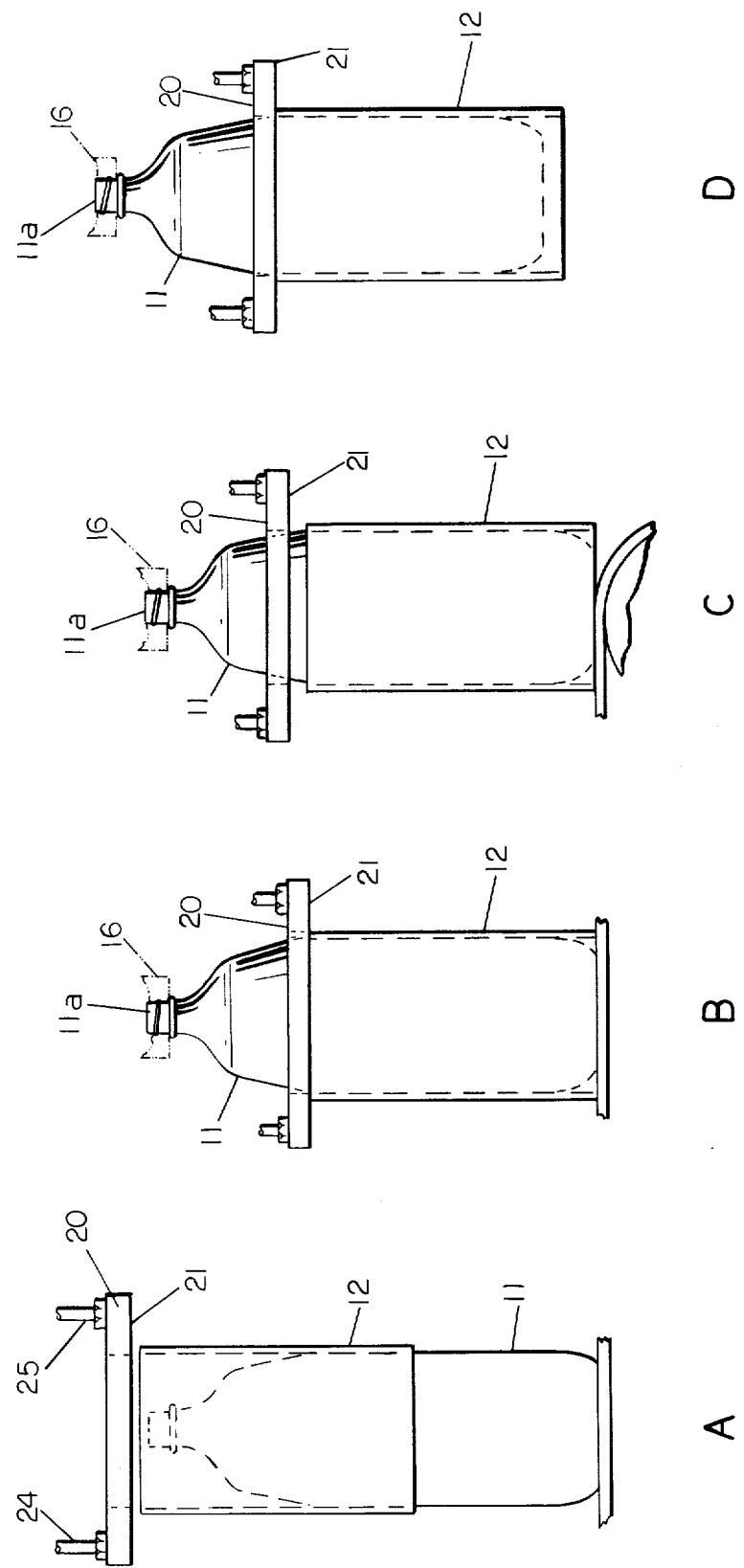
FIG. 6 is a schematic view of sleeve application to the bottle in a stepwise manner.

FIG. 6 shows in schematic form the various positions of the sleeve with respect to the container during the various assembly steps. Step A shows the sleeve over the upper portion of the container as received by the conveyor 10 ready for upper end retention. Step B shows the sleeve lowered on the container to an intermediate position by downward movement of apertured plate 20. Step C shows the plate 20 elevated out of contact with the sleeve, and Step D shows the container elevated with the stationary plate lowering the sleeve into final position on the container. The container bearing the assembled sleeve is then ready for passage through a tunnel oven for heat-shrinking the sleeve into conforming relation.

Various modifications may be resorted to within the spirit and scope of the appended claims.

I claim:

1. The method of precisely positioning a close-fitting tubular sleeve on a generally cylindrical container comprising the steps of placing a close-fitting tubular sleeve in telescoping relation over an upper portion of said container, retaining an upper portion of said container, contacting the upper edge of said tubular sleeve by a coaxially-movable apertured plate and lowering said sleeve to an intermediate position on the container body by downward movement of said apertured plate, separating the said apertured plate from contact with said sleeve, and elevating the said container while restraining the upper edge of said tubular sleeve by said apertured plate to further move the sleeve into precise relative position on said container.

2. The method in accordance with claim 1, wherein said close-fitting tubular sleeve comprises a thin film of thermoplastic material having a thickness ranging from about 1 to 5 mils.

3. The method in accordance with claim 1, wherein said generally cylindrical container comprises a thin-walled thermoplastic bottle.

4. The method in accordance with claim 1, wherein said close-fitting tubular sleeve is comprised of heat-shrinkable thermoplastic film material having diametrically-opposed fold lines and a thickness of about 1 to 2 mils.

5. The method of precisely positioning a close-fitting tubular sleeve of heat-shrinkable thermoplastic film pre-mounted on a generally cylindrical container in telescopic relation comprising the steps of retaining an upper portion of said container, contacting the upper edge of said tubular sleeve by a movable apertured plate having an internal opening slightly larger than the body portion of said container, lowering the said movable apertured plate to thereby lower the said sleeve to an intermediate position on the container body, separating the said apertured plate from contact with said sleeve, and elevating the said container while restraining the upper edge of said tubular sleeve by said apertured plate maintained in stationary relation to further move the said sleeve into precise relative position on the body portion of said container.

6. The method in accordance with claim 5, wherein said tubular sleeve is comprised of polyvinyl chloride film having a thickness ranging from about 1 to 5 mils.

7. The method in accordance with claim 5, wherein said container comprises a thermoplastic bottle having cylindrical sidewalls and a frusto-conical shaped upper region.

8. The method in accordance with claim 5, wherein said tubular sleeve has an axial length complemental to the uniform cylindrical sidewalls of said container.

9. The method in accordance with claim 5, wherein said tubular sleeve is comprised of biaxially-oriented heat-shrinkable thermoplastic film material having a thickness ranging from 1 to 5 mils.

10. Combined apparatus for precisely positioning a close-fitting tubular sleeve pre-mounted on a generally cylindrical container comprising means for conveying said container while retaining an upper portion thereof, a movable apertured plate member mounted above said container adapted to contact the upper edge of said sleeve, means for lowering said movable apertured plate member and thereby said tubular sleeve on said container, means for elevating the said apertured plate member out of contact with said sleeve, and means for elevating said container with the upper edge of said tubular sleeve in renewed contact with said apertured plate member for further lowering said sleeve into precise position on said container.

11. Combined apparatus in accordance with claim 10, wherein said means for conveying said container while retaining an upper portion thereof comprises a partible chucking device adapted to engage the finish area of said container.

12. Combined apparatus in accordance with claim 11, wherein said partible chucking device is mounted within suitable bearing means and is vertically movable on said conveying means, and including means for axially rotating said partible chucking device and thereby said container.

13. Combined apparatus in accordance with claim 10, wherein said means for lowering said apertured plate member comprises a first stationary cam track and movable cam follower mounted therein, the latter being connected to said apertured plate member.

14. Combined apparatus in accordance with claim 10, wherein said means for elevating said container comprises a second stationary cam track and movable cam follower mounted therein connected to said chucking device.

15. Combined apparatus in accordance with claim 10, wherein said movable apertured plate member is mounted in coaxial alignment with said means for conveying said container.

16. Combined apparatus in accordance with claim 10, wherein said means for conveying said container comprises a multiple-jaw chucking device adapted to engage the finish area of said container.

17. Combined apparatus in accordance with claim 10, wherein said movable apertured late member is mounted in vertical alignment with the said means for conveying said container, said plate member having a central aperture slightly greater than the exterior diameter of said container.

* * * * *